US 6,532,952 B1

(12) United States Patent
Kreamer

(10) Patent No.: US 6,532,952 B1
(45) Date of Patent: Mar. 18, 2003

(54) HEATING AND COOLING SOLAR SYSTEM CONTROL MODULE

(76) Inventor: William Kreamer, 129 Miller St., Belfast, ME (US) 04915

( * ) Notice: Subject to any disclaimer, the term of this patent is extended or adjusted under 35 U.S.C. 154(b) by 0 days.

(21) Appl. No.: 09/642,302

(22) Filed: Aug. 21, 2000

(51) Int. Cl.⁷ .................................................. F24J 2/46
(52) U.S. Cl. ...................... 126/628; 126/591; 126/647; 126/633
(58) Field of Search ................................. 126/628, 629, 126/632, 633, 647, 591, 599, 618, 572; 236/93 A

(56) References Cited

U.S. PATENT DOCUMENTS

| | | | | |
|---|---|---|---|---|
| 4,091,863 A | * | 5/1978 | Schorder | 126/400 |
| 4,237,865 A | * | 12/1980 | Lorenz | 126/629 |
| 4,369,766 A | * | 1/1983 | Coley | 126/572 |
| 4,411,255 A | * | 10/1983 | Lee | 126/633 |
| 4,493,366 A | * | 1/1985 | Ekman | 126/629 |
| 4,498,457 A | * | 2/1985 | Kreamer | 126/629 |
| 4,739,627 A | * | 4/1988 | Baumann | 126/629 |
| 6,178,966 B1 | * | 1/2001 | Breshears | 126/629 |

FOREIGN PATENT DOCUMENTS

| | | | |
|---|---|---|---|
| EP | 0 661 502 A2 | * | 7/1995 |
| JP | 56-30555 A | * | 3/1981 |

* cited by examiner

Primary Examiner—Henry Bennett
Assistant Examiner—Josiah Cocks
(74) Attorney, Agent, or Firm—William Hamrock, PA

(57) ABSTRACT

A control for a solar-heating and ventillation-cooling air type solar system has temperature sensors, dual air distribution valves, valve actuators and a fan-integrated into a single module that is removably mounted together with a modular solar system enclosure. The control senses the interior space temperature and the exterior enviornment temperature, and determines and effects a solar system operating mode to provide a comfort function in all seasons. The control provides recirculation heating, direct heating, ventillation cooling and cool conservation, or variable combinations thereof.

9 Claims, 4 Drawing Sheets

HEATING AND COOLING SOLAR SYSTEM CONTROL MODULE

BACKGROUND OF THE INVENTION

The present invention relates to solar energy collection apparatus and more particularly to an integrated multivalve air handling control module for an interior heating, interior ventilating, and interior isolating air type solar thermal system.

In the past, solar energy collectors for air space heating have served no useful purpose in warm or hot weather. To eliminate heat production and overheating of the living space in warm or hot weather, the user cannot disable air type collectors by simply turning off fans or blocking the flow of air, which can cause overheating damage to the collector, but must remove or cover them manually. Some prior art air type collectors have collector enclosure vents that somewhat reduce collector overheating, but these vents do not permit sufficient air flow for adequate collector cooling, and they do not provide a comfort function. Other prior art collectors have an outlet diverting valve. These collectors are protected against overheating, and provide cool weather ventilation as a limiting mechanism, but in hot weather the fan pulls hot exterior air through the living space, overheating it and causing discomfort to the occupants. Applicant's U.S. Pat. No. 4,498,457, issued Feb. 12, 1985 has been an extreme improvement in the solar system field up to the present time. The present invention has progressed far beyond the prior art by providing a unique heating and cooling solar system previously unavailable.

BRIEF DESCRIPTION OF THE INVENTION

The invention is directed to solar heating systems for heating an enclosed interior space wherein air from the space is directed into the solar system through an interior intake port, heated by being passed over an absorber of solar energy and then directed through an interior outlet into the interior space. The improvement of the present invention is a multi-valve control module that is removably mounted within a modular solar system. The control module includes:

- a unifying frame for supporting and maintaining alignment of the control components, insulating hot areas from cold areas, and permitting easy removal of the control module;
- a two position three way intake valve with an interior intake port from the interior space and an exterior intake port from the outside exterior environment, including a single flow-directing adjustable closure for simultaneously closing the interior intake port and opening the exterior intake port and vice versa;
- a temperature-responsive actuator for positioning the intake valve's adjustable closure, in response to the air temperature of the exterior environment; upon rising exterior temperature, when a pre-determined exterior temperature is sensed the interior intake port is closed, and exterior air is supplied directly to the solar system from the exterior through the exterior intake port;
- a two-position three-way outlet valve with an interior outlet port to the interior space and an exterior outlet port to the exterior environment, including a single flow directing adjustable closure for simultaneously closing the interior outlet port and opening the exterior outlet port and vice versa;
- a temperature sensitive actuator for positioning the outlet valve's adjustable closure, in response to the air temperature of the interior space; upon rising interior space temperature, when a predetermined interior temperature is sensed, the interior outlet port is closed, and solar heat is diverted directly to the exterior environment through the exterior outlet port;
- and all solar energy sensing, and fan components.

In a preferred embodiment, the temperature sensitive actuator includes a phase-change thermal actuator linked to each valve's adjustable closure, and heat is introduced from the solar absorber to the temperature sensitive actuator of the outlet valve. The heat is transferred by an adjustable flow of air through a duct from the solar heated high temperature area to the actuator. This is combined with heat in the ambient air near the actuator's location to control the position of the actuator.

In another preferred embodiment, the temperature sensitive actuator includes a phase change thermal actuator linked to each valve's adjustable closure, heat is introduced from the solar absorber to the temperature sensitive actuator of both the intake valve and the outlet. The heat is transferred by adjustable flows of air through a pair of ducts from the solar heated high temperature area to the actuator. This is combined with heat in the ambient air near each actuator's location to control the functioning of the actuator.

DETAILED DESCRIPTION OF THE PREFERRED EMBODIMENT

Figure 1:
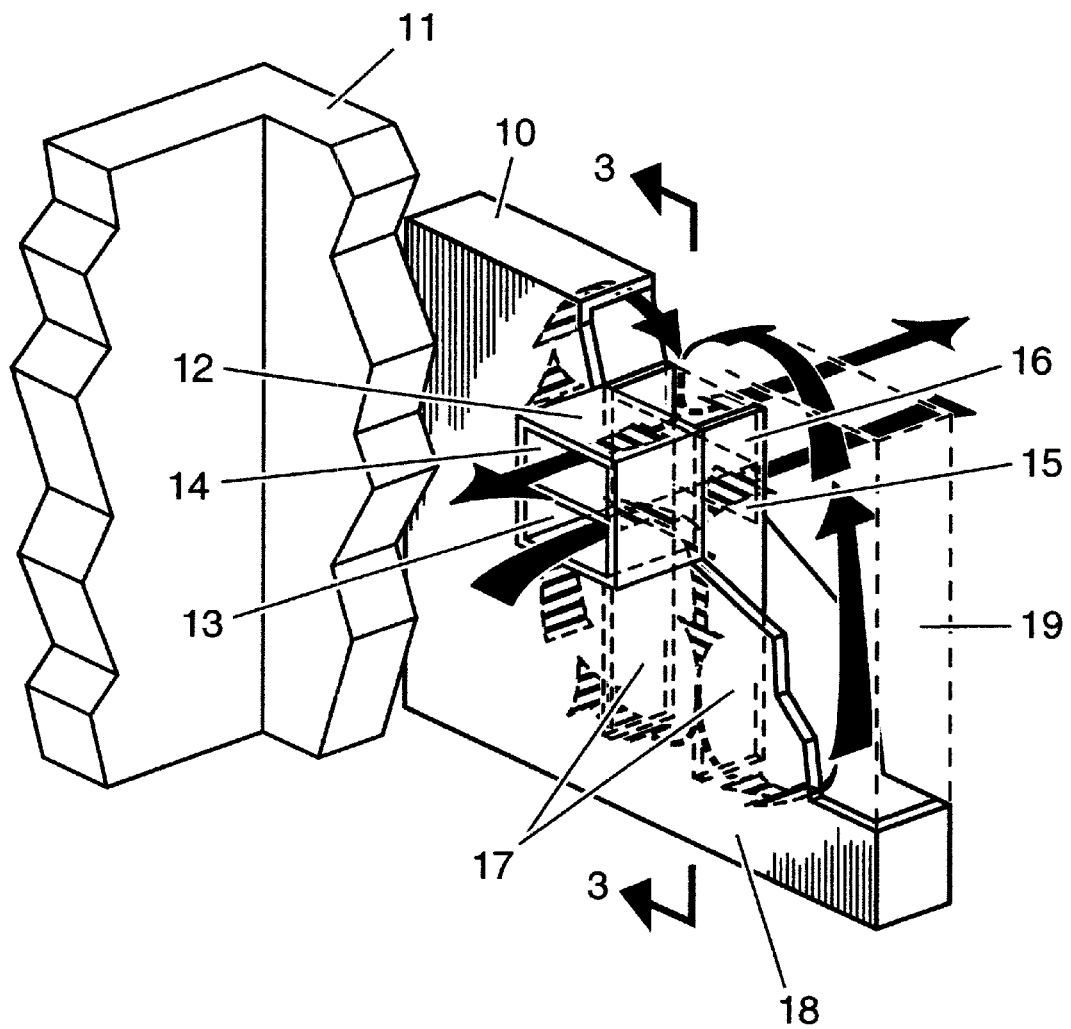
FIG. 1 is a perspective view of a wall mounted solar system module incorporating the control module of the present invention, showing the location of the ports and the air paths of the module

Referring to the drawings, FIG. 1 shows solar module 10 mounted on exterior wall 11 of the building having connected air-flow manifold 12 containing interior intake port 13 and interior outlet port 14 projecting through wall 11 into the interior space of the building. On glazed front surface 19 of solar module 10 are exterior intake port 15 and exterior outlet port 16. Air enters solar module 10 either from the interior through interior intake port 13, or from the exterior or outside through exterior intake port 15. It is then directed downwardly into the central space between baffles 17, which extend from insulated rear surface 18 to glazed front surface of solar module 10. The air then passes under the lower ends of baffles 17 and flows upwardly in the lateral spaces on the outer sides of the baffles. From there the air flows over the top of the baffles to the center at the top of solar module 10 and exits downwardly into the interior through interior outlet port 14, or exits to the exterior through exterior outlet port 16. In passing through the central space between the baffles and the lateral spaces on the outer sides of the baffles, the air passes in close proximity to a conventional absorber of solar energy well known in the art.

Figure 2:
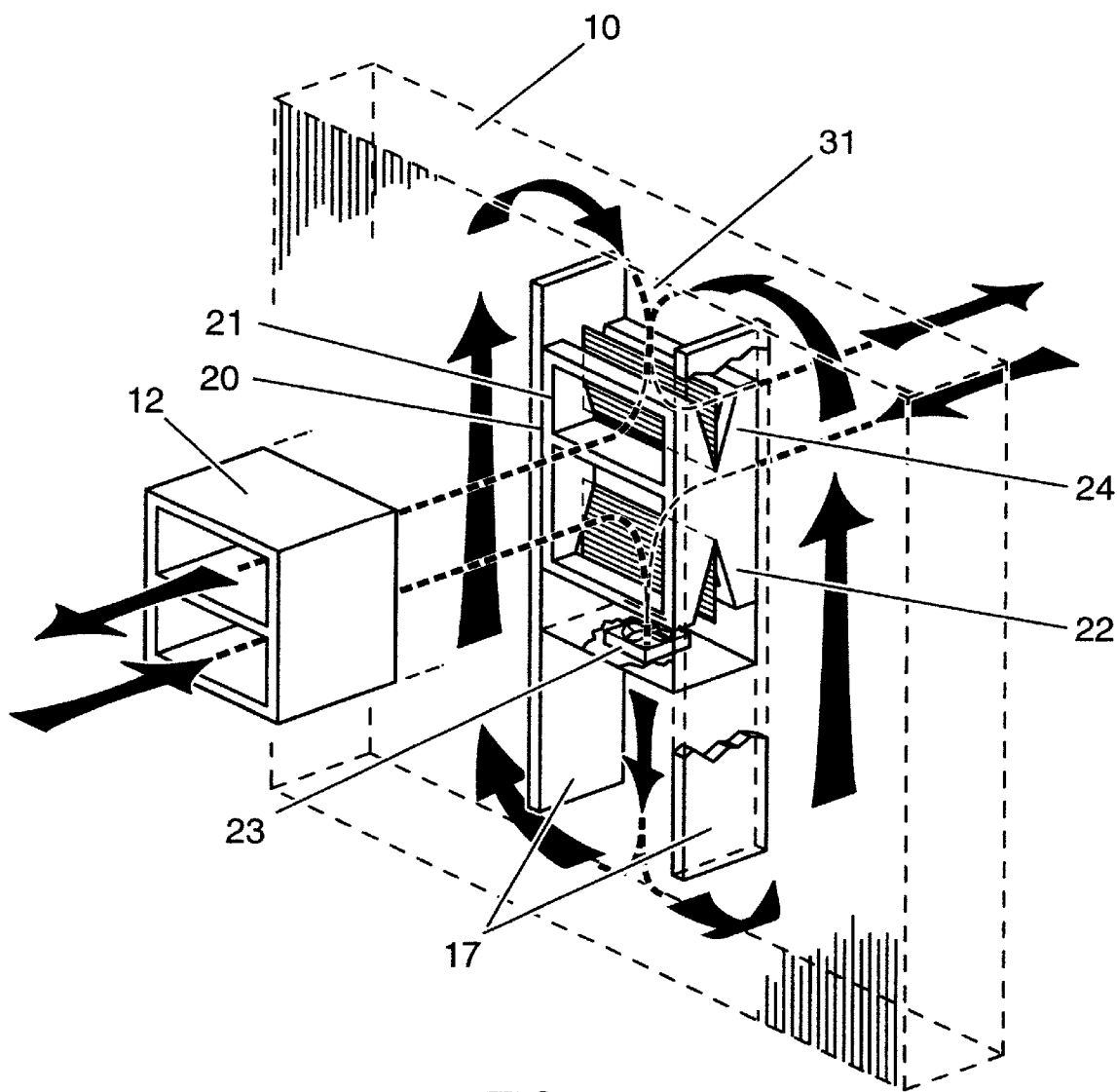
FIG. 2 is a perspective view of the wall mounted solar system module with the connecting manifold removed.

Shown in FIG. 2 is a detailed perspective view of the wall mounted solar module 10 having connecting air-flow manifold 12 removed to reveal control module 20 which is mounted within the interior of solar module 10. Control module 20 includes unifying frame 21 which integrates the control module, enclosing two-position three way intake valve 22, fan 23, and two position three way outlet valve 24. The fan moves air along a path defined first by intake valve 22 and fan 23, then by baffles 17 and the interior surfaces of solar module 10, next by high temperature area 31 and finally by outlet valve 24. The path available through the intake and outlet valves depends on the combined state of the novel control module's intake and outlet valves which is more clearly described below.

Figure 3:
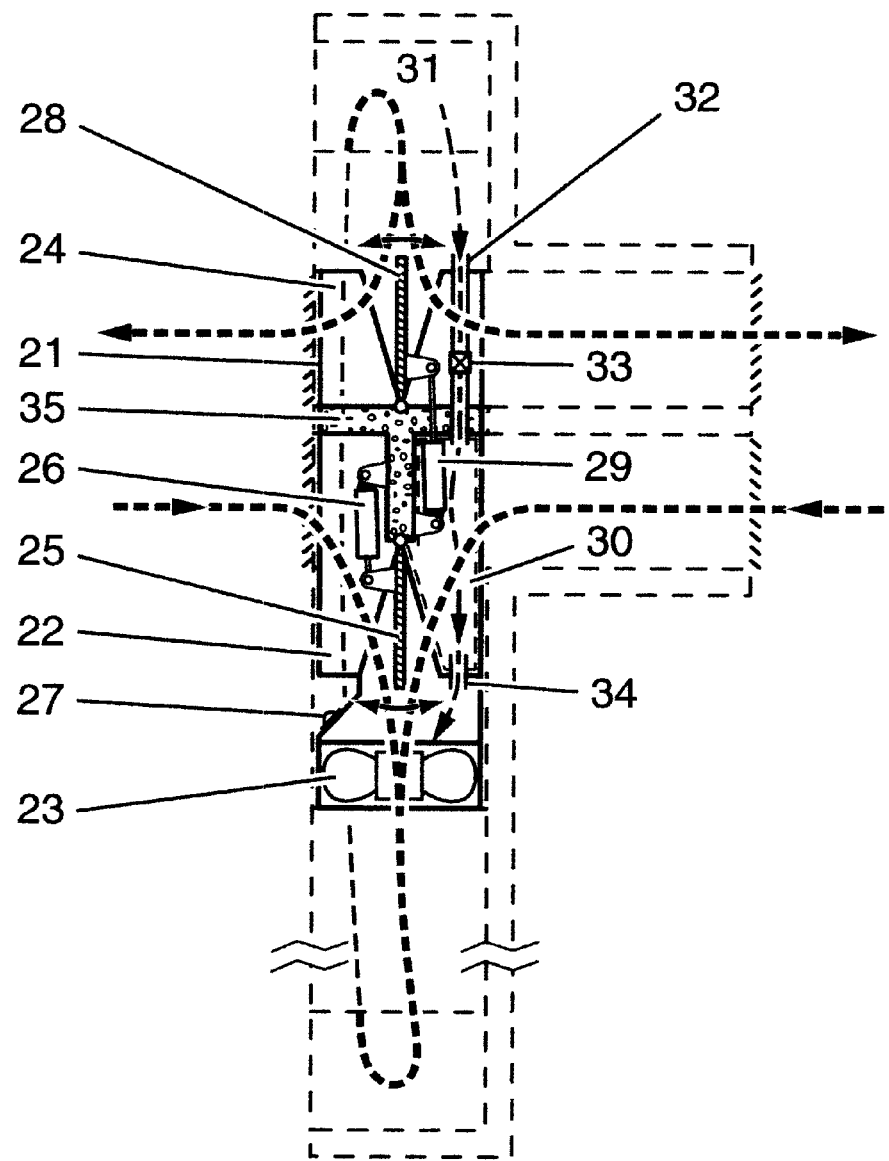
FIG. 3 is a sectional view taken on line 3—3 of FIG. 1 showing the control valves, the actuators and the adjustable closures

FIG. 3 shows integrated control module 20 with unifying frame 21 containing two position three-way intake valve 22 with adjustable closure 25 and phase change actuator actuator 26, fan 23 controlled by solar-energy-sensing thermostat 27, having conventional motor and electrical circuitry not shown, two-position three-way outlet valve 24 with adjustable closure 28, and phase change actuator 29 mounted within mounting chamber 30. As one of the intake ports 13 or 15 of intake valve 22 is closed by the action of actuator 26 on the adjustable closure 25, the other inlet port is opened. Similarly, as one of the outlet ports 14 or 16 of outlet valve 24 is closed by the action of actuator 29 on adjustable closure 28, the other outlet port is opened. When either valve is in an intermediate position, a portion of the air flows through each partly-open port of the valve. Thus, an open flow path is always positively maintained to promote thermosyphoning, resulting in solar system module 10 being protected from damage caused by overheating in hot weather due to flow stagnation during a power outage.

To increase the effeciency of the system, unifying frame 21 incorporates insulation 35 between the hot and cold air flow paths, adjustable closures 25 and 28 are likewise insulated.

The phase change actuator 26 or 29 and the valves of the control module of the present invention exhibit a regular and deliberate movement as the ambient air temperature passes through the melting/freezing transition temperature of the phase-change material contained within the body of the actuator. The resulting regular movement of the adjustable closures 25 and 28 effects a smooth transition between the operating modes. The rate of movement of each of the actuators depends upon the rate at which heat is supplied to or removed from the phase-change material by its surroundings.

Because of its location in the intake area, outlet actuator 29 is subjected to a continuous flow of interior temperature air, whether induced by thermosyphoning action or by fan 23. Likewise, intake actuator 26 because of its location in the exterior intake area port, is directly exposed to the exterior environment temperature, so that the proper and timely positioning of of the control system's air handling elements in response to the interior and exterior temperatures, and the timely selection of the proper operating mode, is ensured. If the full heating capacity of the solar system is greater than the heating requirement of the interior space, then as the interior room temperature rises to the set point of the solar system, outlet valve 29 reduces the heating action of the system by moving outlet adjustable closure 28, simultaneously decreasing the flow of air to the interior and increasing the flow to the outside.

Adjustable control of the effective setpoint of a phase change thermal actuataor under the principal influence of a flow of air at one temperature by the adjustable introduction of a biasing air flow at another temperature is known to those skilled in the art.

Shown in FIG. 3 are means for diverting a portion of the solar-heated air from high temperature area 31 to the inside of mounting chamber 30, thus adding the biasing influence of the solar-heated air to the principal influence of the interior temperature air flowing into the interior intake port around mounting chamber 30. The combination of influences produces a median air temperature within the chamber in contact with outlet valve actuator 29. Said means for diverting the solar-heated air includes conducting tube 32 and variable orifice 33. Solar-heated air is drawn through conducting tube 32 and mounting chamber 30 by fan 23, in an amount governed by the setting of variable orifice 33. This provides a means of raising the temperature of the air next to actuator 29 to the phase change temperature of the phase-change material contained within the body of the actuator, at various selectable intake air temperatures lower than the phase-change temperature. By adjusting variable orifice 33, the user selects the intake air temperature at which the heating action of the system is limited.

In the novel control module of the present invention, a second control valve, intake valve 22, has an adjustable closure 25 positioned by phase change actuator 26, which responds to the temperature of the exterior environment, intake valve 22 acts in concert with outlet valve 24 to provide novel comfort functions in cool, warm and hot weather.

Either one or both of the phase-change thermal actuators may be an electro-mechanical phase-change thermal actuator well-known to those skilled in the art of phase-change thermal actuators. Electro-mechanical phase-change thermal actuators are available from Starsys Research Corporation, 409 Nautilus Ct. North, Boulder, Colo. 90301. This provides closer control of the control modes of the present invention, and hence closer control of interior temperature.

To insure that the novel introduction and location of intake valve 22 does not compromise outlet valve 24 interior temperature-responsive function, the flow of air through mounting chamber 30 to fan 23 must be maintained even when intake valve 22 has shut interior intake port 13. This is accomplished by providing a communicating passage 34 at the lower end of mounting chamber 30 leading directly to the fan.

With the intake valve 22 in the interior port position in cold and cool weather, this ensures that:

a) when the interior temperature drops below the setpoint, the outlet valve 24 moves to the interior port position, cooperating with intake valve 22 to recirculate solar heated air to the interior.

b) when the interior living space temperature rises to the setpoint, outlet valve 24 moves to the exterior port position, cooperating with intake valve 22 to ventilate the interior with cooler exterior air pulled into the interior through infiltration.

The novel ability of the intake valve to shift to the exterior port position ensures that in warm or hot weather:

a) If the outlet valve 24 is in the interior port position, such as when the interior requires heat, intake valve 22 will bring hotter exterior outside air directly into the system. This increases the system outlet temperature and speeds interior heating;

b) If the outlet valve 24 is in the exterior port position, such as when the interior does not require heat, intake valve 22 will not draw hot exterior air through the interior inappropriately;

The following are the four operating modes of the novel control system are shown in FIGS. 4, 5, 6 and 7.

Figure 4:
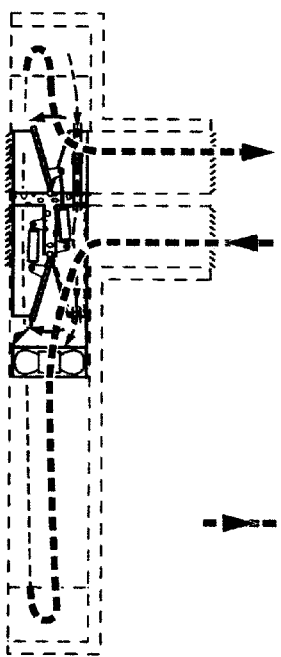
FIGS. 4, 5, 6 and 7 show the control valve positions that produce four distinct operating modes of the modular control.

Recirculation Solar Heating is shown in FIG. 4. In cool weather, as the solar system raises the interior temperature to the setpoint, outlet valve 24 will limit the output of the system by moving to an intermediate position. With intake valve 22 in the interior port position, this provides partial recirculation of solar heated air through the partly open interior port 14, and partial venting through the partly open exterior outlet port 16. Partial venting causes partial room ventillation as exterior infiltration replaces interior air, as the interior temperature rises further, outlet valve 24 moves to the full exterior port position, providing full ventilation. The flow path will be from the interior intake port, through the collector, and out the exterior outlet port, the exterior intake port will be closed, and the exterior outlet port will be open.

Figure 5:
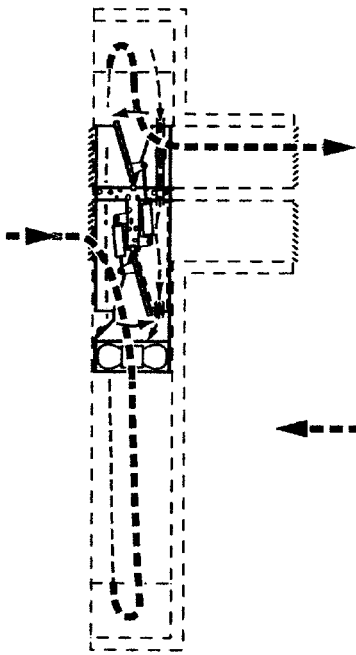

Direct Solar Heating is shown in FIG. 5. In the transition season between cool and warm weather, the exterior temperature will rise to the comfort level while the interior temperature is still below the solar system setpoint. With outlet valve 24 in the interior port position, as the exterior temperature moves above the comfort range, intake valve 22 will move to the exterior port position, closing interior intake port 13. The flow path will be directly from the exterior intake port 15, through the collector, and into the interior space through interior outlet port 14.

Figure 6:
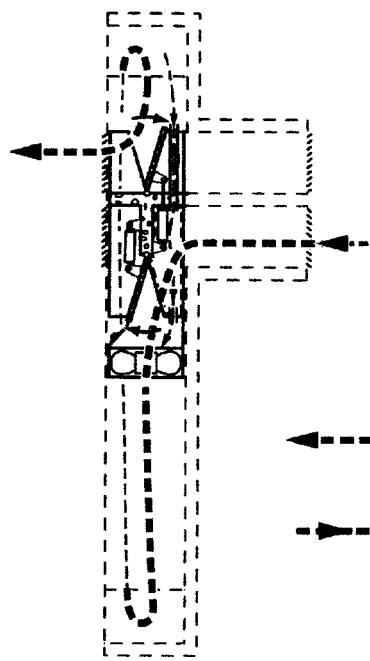

Ventilation Cooling is shown in FIG. 6. In cool or warm weather, if the interior temperature reaches the solar system setpoint before the exterior temperature rises above the comfort level, outlet valve 24 moves to the exterior port position, while intake valve 22 remains in the interior intake position to ventilate the interior with cooler exterior air.

Figure 7:
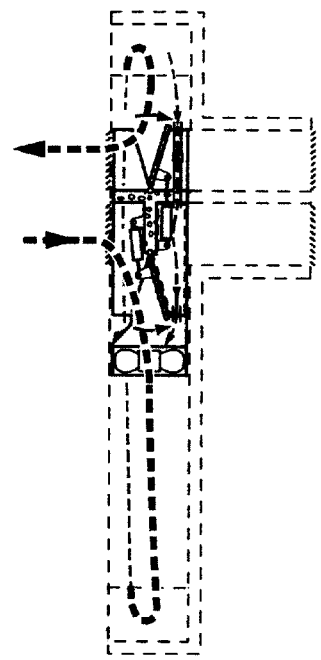

Collector Safety Cooling/Cool Air Conservation is shown in FIG. 7. In warm or hot weather, with the interior temperature at or above the solar system setpoint, both interior ports will be closed. The flow will be directly from the exterior intake port, through the collector, and out the exterior outlet port.

The control module novel series arrangement of two temperature-responsive intakes 13 and 15, and two temperature-responsive outlets 14 and 16, provides the four distinct flow paths depicted in FIGS. 4, 5, 6 and 7, and the four operating modes of the control module module 10, each with a separate demonstrable benefit to the user.

The unique integration of the actuators, temperature sensors, control passages, and fan into a single removable entity provides a novel year-round heating and cooling solar system control module.

The foregoing detailed description of the preferred embodiment of the invention is intended to be by way of illustration and not by way of limitation. It is intended that the scope of the invention be limited only by the proper interpretation of the claims.

What is claimed is:

1. In an exteriorly mountable solar heating system for heating an interior space, wherein air from within the space is directed into the system through an interior intake port, and wherein the air is heated by being passed over an absorber exposed to solar energy and directed to an interior outlet port into said space, an improved heating and cooling solar system control module comprising:

means for providing an exterior intake port from the exterior environment into the system and an exterior outlet port from the system to the exterior environment, unifying control module enclosure means for both interior and exterior intake port means and interior and exterior outlet port means, in communication with both the interior space, the exterior environment and the solar system, wherein said control module enclosure means encloses an intake valve means and an outlet valve means in communication with said intake and outlet ports, and with temperature-responsive actuators for completely or partly opening and closing said intake valves and completely or partly opening and closing said outlet valves, and wherein said intake valve actuator is responsive to the temperature of the exterior environment and said outlet valve actuator is responsive to the temperature of the interior space, whereby air heated by passing over said absorber is directed into said interior space, and/or is vented to the atmosphere when the temperature of the air in said interior space reaches an adjustable temperature, and whereby air enters the system from the interior space, and/or from the exterior environment when the temperature of the air of said exterior environment reaches a determined temperature.

2. The control according to claim 1 wherein said actuators are powered solely by temperature responsive phase change material that exhibits a melting temperature in the upper region of the normal comfort range, changing phase in response to the temperature sensed, wherein said actuators are exposed to and sense the temperature of air from said space or said exterior environment passing through said interior and exterior intake ports.

3. The control according to claim 1 wherein at least one of said actuators is an electro-mechanical phase change actuator, well known in the art of phase change actuators.

4. The control according to claim 2 comprising means for biasing the temperature of air sensed by said outlet valve actuator to adjust an effective interior temperature setpoint of the actuator, said biasing means combines heat from a controllable flow of air heated by said absorber with heat from the region near the interior intake port adjacent to said actuator to sense the temperature of the combined heats.

5. The control according to claim 4 wherein said biasing means is for biasing the temperature of air sensed by the intake valve actuator and said biasing means combine heat from a controllable flow of air heated by said absorber with heat from the region near the exterior intake port adjacent to said actuator, so the actuator senses the temperature of the combined heats.

6. The control according to claim 5 comprising means for biasing the temperature of air sensed by both the intake valve actuator and the outlet valve actuator, to adjust the effective interior temperature setpoint, wherein said biasing means comprises means for combining heat from a controllable flow of air heated by said absorber with heat from the enviroment near the ports where the actuators are mounted, so the actuators sense the temperature of the combination.

7. The control according to claim 1 wherein said enclosure encloses mounting means for a fan to move the air through the solar system, and a solar energy sensor to control said fan in response to solar energy input.

8. The control according to claim 1 wherein said control is removable from the solar heating system.

9. The control according to claim 4 wherein said biasing means includes communicating passage means for insuring that the bias air flow can bypass the intake valve and pass directly from said actuator's mounting chamber to the area just downstream of the intake valve.

* * * * *